United States Patent
Johnson et al.

(10) Patent No.: US 7,491,669 B2
(45) Date of Patent: Feb. 17, 2009

(54) ADSORBENT WITH MULTIPLE LAYERS

(75) Inventors: Darren Johnson, Eugene, OR (US);
Melanie Pitt, Eugene, OR (US); James M. Harris, Menlo Park, CA (US)

(73) Assignee: Crystal Clear Technologies, Inc., Menlo Park, CA (US)

( * ) Notice: Subject to any disclaimer, the term of this patent is extended or adjusted under 35 U.S.C. 154(b) by 278 days.

(21) Appl. No.: 11/350,202

(22) Filed: Feb. 7, 2006

(65) Prior Publication Data

US 2007/0181502 A1    Aug. 9, 2007

(51) Int. Cl.
*B01J 29/04*    (2006.01)
(52) U.S. Cl. .................... 502/64; 502/402; 502/415; 977/902; 423/610
(58) Field of Classification Search ................. 977/902; 502/64, 402, 415; 423/610
See application file for complete search history.

(56) References Cited

U.S. PATENT DOCUMENTS

| | | |
|---|---|---|
| 5,049,280 A | 9/1991 | Raymond |
| 5,766,908 A | 6/1998 | Klein |
| 5,892,029 A | 4/1999 | Raymond |
| 6,080,319 A | 6/2000 | Alther |
| 6,670,427 B1 | 12/2003 | Ulbricht |
| 6,838,005 B2 | 1/2005 | Tepper |
| 2004/0026322 A1 * | 2/2004 | Nussbaumer et al. ........ 210/644 |
| 2004/0108274 A1 | 6/2004 | Schulze-Makuch et al. |

OTHER PUBLICATIONS

Caulder, Dana L.,et al.;"The rational design of high symmetry coordination clusters";J. Chem. Soc. Dalton Trans.,1999,1185.
Turner, David R., et al.; Molecular Con tainers:Design Approaches and Applications; Structure and Bonding, vol. 108, 2004, 97. Springer-Verlag.
Castellano, Ronald K., et al.;"Formation of Discrete Functional Assemblies and Informational Polymers through the Hydrogen-bonding Preferences of Calixarene Aryl and Sulfonyl Tetraureas"; J.Am. Chem. Soc., 1998, 120, 3657.
Carter, T.G., et al.;"Secondary Bonding Interactions Observed in Two Arsenic Thiolate Complexes"; Inorganic Chemistry; 2005, 44, 9634-9636.
Vickaryous, W.J., et al.;"Arsenic-IIInteractions Stabilize a Self-assembled As2L3 Supramolecular Complex"; Angew. Chem. Int. Ed. 2004, 43, 5831.

* cited by examiner

*Primary Examiner*—Chester T Barry
(74) *Attorney, Agent, or Firm*—Fernandez & Associates, LLP

(57) ABSTRACT

A method, article of manufacture and apparatus are disclosed for binding successive layers of a "guest specie" such as an atom, cation, anion, organic molecule, and/or pathogen to a substrate or multiple different substrates. Possible substrates include materials with a porous nature; macro, micro and nano porous materials are all candidates. The adsorbent capacity of a substrate is extended by coordinating a layer of bi- or multi-functional ligand (L) to an adsorbed atom or ion or molecule or pathogen, which is then coordinate to a second layer of adsorbed atom or ion or molecule or pathogen.

13 Claims, 6 Drawing Sheets

Synthesis of [As$_2$L$_3$] assemblies.

Structure of [As$_2$L$_3$] in crystal. a) ORTEP representation with 50% thermal ellipsoids. b) and c) Wireframe representations with arsenic atoms shown as space-filling spheres, the view in (c) is along the pseudo-threefold axis of the assembly

H$_2$L

Aliphatic dithiols

Aromatic dithiols

Aliphatic and aromatic dicarboxylic acids
Aliphatic and aromatic diamines

Dicatecholates

Aliphatic and aromatic phosphines and phosphine oxides

Phosphonic acids for absorption to titanium oxide particles.

Silanes used to functionalize silica zeolite.

A crystal structure of the cavitand which can be likened to a deep bowl in which a guest can reside

US 7,491,669 B2

ADSORBENT WITH MULTIPLE LAYERS

FIELD OF INVENTION

This invention relates generally to water purification by an adsorbent; more specifically to an organic coating which can be added to a substrate for enhancing the adsorption of selected species and then repeated to increase the overall capacity of the adsorbent.

BACKGROUND OF INVENTION

Environmental contamination from a variety of sources is a serious and continuing problem, especially in developing countries where access to expensive remediation technologies is generally limited. Arsenic, lead, and other heavy metals are common contaminants which are desirable to remove from drinking water. Much research effort has been directed toward developing in vivo chelators to treat cases of acute metal poisoning; however, these chelators do not allow metals such as Pb(II) or As(III) to adopt their preferred coordination geometries, which may contribute to their lack of selectivity.

Self-assembly of discrete supramolecular aggregates utilizing reversible coordinate bonding interactions has provided access to elaborate and precisely designed structures that have generated an enormous amount of interest. Transition metals have been most widely used in designing coordination-driven discrete structures. In contrast, much less work focuses on using main-group elements as directing units for the construction of supramolecular structures. Recent work has demonstrated that As(III) in combination with appropriately designed bridging thiolate ligands(L) can self-assemble into a discrete dinuclear $As_2L_3$ structure, supported by a secondary supramolecular interaction between the lone pair of As(III) and the aromatic ring of L. These secondary bonding interactions (SBIs) can take many forms, as shown in the assembly of a naphthalene-imide ligand with As(III) where weak arsenic-oxygen interactions support a highly symmetric complex in solution. These SBIs may similarly work to confer selectivity for a target analyte.

Previous work has shown that $As^{III}$ and other heavier main group elements with stereochemically active lone pairs can form close contacts with arene rings in the solid state. To analyze this attractive interaction Density Functional Theory calculations were performed on the $AsCl_3$-benzene dimer. These studies revealed a lower limit for the binding energy of 7.4 kcalmol$^{-1}$ for the arsenic-arene interaction, with C~As distances of 3.2-3.4 A°. Furthermore, although the preferred geometry of the interaction orients the arsenic lone pair at a 68° angle to the phenyl ring; this structure is only 0.5 kcalmol$^{-1}$ more stable than the two C3-symmetric arrangements. This suggests that, while this interaction is quite strong, its geometry is flexible. This lone pair-π interaction may work in the constraints of this Invention to induce either stronger binding or the possibility of selectivity for a given target.

Raymond in U.S. Pat. No. 5,049,280 (1), included herein by reference, teaches the use of a ligand to bind iron in solution. A portion of the ligand may comprise an organic linking group, A, bonded to a solid substrate, Q. The compound chelates or sequesters one metal ion per compound. These compounds are termed herein "monofunctional" in that one molecular ligand attaches or sequesters one target specie, in Raymond's case a metal ion such as $Fe^{+3}$. In J. Chem. Soc., Dalton Trans., 1999, 1185 (2), included herein by reference, Caulder and Raymond discuss various supramolecular structures. The simplest multi-metal cluster contains two metal sites linked by one or more ligands. When these two metal ions are linked by three identical $C_2$-symmetric ligand strands, written as $M_2L_3$, the resulting bimetallic cluster is called a triple helicate if both metal ions have the same chirality; an example is dihydroxamine siderophore rhodotorulicacid; other examples are found in the reference. Catecholamide and hydroxamate ligands are excellent choices for binding units in supramolecular complexes because of the high stability and lability of these chelates with +3 metal ions with octahedral coordination environments; Hydroxypyridinone and pyrazolone ligands are also useful in synthesizing supramolecular clusters. $M_4L_6$ complexes are also discussed wherein the vertices of a tetrahedron act as interaction or coordination sites for four metal ion species and six ligands act as edges of the tetrahedron. These ligand compounds are termed herein "bifunctional" for the two specie case and "multifunctional" for the higher order cases.

Turner, in "Molecular Containers: Design Approaches and Applications"; Structure and Bonding, Vol. 108, 2004, 97 (3); included herein by reference, discusses numerous "molecular containers", completely enclosed hollow species capable of holding one or more guest species inside, and their ability to form a covalent assembly of "guest-encapsulating host species"; the first examples of host species binding their guests within a three-dimensional array of interactions were the class of compounds known as cryptands, discussed in a 1969 article; typically cryptands are synthesized by the addition of a diacyl-chloride to an azacrownether. Turner describes other molecular shapes such as a cavitand, which can be likened to a deep bowl in which a guest can reside, shown in FIG. 6A. Turner describes carcerands and hemicarcerands wherein a guest specie is enclosed by a cage compound; one way to envision this structure is two cavitands linked such that the bowl openings of each cavitand are facing each other, similar to a clam shell with a guest specie trapped inside.

Castellano, in "Formation of Discrete, Functional Assemblies and Informational Polymers through the Hydrogen-Bonding Preferences of Calixarene Aryl and Sulfonyl Tetraureas"; J. Am. Chem. Soc. 1998, 120, 3657 (4); included herein by reference, discusses calixarenes with urea functions and how they create capsules. Castellano describes a dumbbell arrangement of two capsules and a 3 capsule arrangement in a triangular shape. All four previous references demonstrate the ability of a ligand of varying complexity to bind, covalent or labile, a "guest" specie; none of the references teach the ability of a bi- or multi-functional ligand to bind to a series of "guests" as shown in FIGS. 3 and 6B.

A metal complex, also known as coordination compound, is a structure composed of a central metal atom or ion, generally a cation, surrounded by a number of negatively charged ions or neutral molecules possessing lone pairs. Counter ions often surround the metal complex ion, causing the compound to have no net charge. The ions or molecules surrounding the metal are called ligands. Ligands are generally bound to a metal ion by a coordinate covalent bond, and are thus said to be coordinated with the ion. The process of binding to the metal ion with more than one coordination site per ligand is called chelation. Compounds that bind avidly to form complexes are thus called chelating agents (for example, EDTA). Coordination numbers, or the number of bonds formed between the metal ions and ligands, may vary from 2 to 8. The number of bonds depends on the size, charge, and electron configuration of the metal ion. Some metal ions may have more than one coordination number. Different ligand structural arrangements result from the coordination number. A coordination number of 2 corresponds with a linear geometry; a coordination number of 4 corresponds with either a tetrahedral or square planar molecular geometry; and a coordination number of 6 corresponds with an octahedral geometry. Simple ligands like water or chlorine form only one link with the central atom and are said to be monodentate. More examples of monodentate ligands include hydroxide, nitrite, and thiocyanate. Some ligands are capable of forming multiple links to the same metal atom, and are described as bidentate, tridentate etc. Oxalate and ethylenediamine (en) are examples of bidentate ligands, while diethylenetriamine (dien) is a tridentate ligand. EDTA is hexadentate, which accounts for the great stability of many of its complexes. Herein the terms coordination site, attraction site, binding site, linking site and interaction site are used approximately equivalently.

Previous work with coated or surface-modified zeolites may be found in U.S. Pat. No. 6,080,319 (5) and U.S. 2004/0108274 (6); both disclose methods for adsorbing contaminants, including pathogens, onto a porous substrate such as zeolite. U.S. Pat. No. 6,838,005 (7) teaches a nano-porous, synthetic substrate of aluminum hydroxide fibers for adsorption purposes. None of the examples teach a method to increase the adsorptive capacity of a substrate or filter by adding additional layers or coatings of an adsorption enabling material such as a bi- or multi-functional ligand.

Conventional adsorbents, including carbon, zeolites and synthetic resins from Dow Chemical or Rohm & Haas, have limited capacity for contaminants; a typical loading capacity ranges from below 0.01% by weight to maybe as high as 0.5% by weight, depending on the conditions. In general a contaminated adsorbent is then disposed of in a hazardous landfill, an expensive situation. Heavy metals such as lead, mercury and other pollutants such as arsenic and uranium are expensive to remove from water and expensive to dispose of. With the scarcity of potable drinking water the problem is acute. There is a need for an inexpensive adsorbent for contaminants in water which has increased capacity and ease of disposal. Other applications and embodiments of the instant invention are included herein as will be apparent to one knowledgeable in the art.

SUMMARY OF INVENTION

A method, article of manufacture and apparatus are disclosed for binding successive layers of one or more "guest species" such as an atom, cation, anion, organic molecule, and pathogen to a substrate or multiple different substrates. Possible substrates include materials with a porous nature; macro, micro and nano porous materials are all candidates. The adsorbent capacity of a substrate is extended by coordinating a layer of bi- or multi-functional ligand (L) to an adsorbed atom or ion or molecule or pathogen, which is then coordinate to a second layer of adsorbed atom or ion or molecule or pathogen. The sequence ["guest specie"]+ligand+["guest specie"]+ligand+["guest specie"] is repeated multiple times, greatly increasing the adsorbent capacity of an underlying substrate. In addition to increasing the adsorbent capacity, reducing the cost of purification and creating a recoverable source of a removed "guest specie" or, in some embodiments, contaminant, are also objects of the instant invention. In some embodiments a "guest specie" may adsorb directly to natural or constructed attachment sites on a substrate; alternatively a ligand may be capable of attaching to a synthetic attachment site on a given substrate. A distinctive feature of the instant invention is a capability of a bi- or multi-functional ligand's to enable multiple adsorbed layers of one or more predetermined specie of interest by attaching to a guest specie of one layer as well as attaching to at least one more guest specie to enable a subsequent layer.

Another object of the present invention is to provide a method for low cost remediation of contaminated water. Another object of the present invention is to provide a method for separating species of interest from a fluid; a fluid may be water or blood or other liquids whose utility may be enhanced by separating or sequestering certain species present in the fluid. In one embodiment a fluid may be an air stream comprising air and "specie of interest" such as volatile organics, or VOC'S.

A ligand (L) may have interaction or coordination sites specific to a given species or class of heavy metals, such as lead; alternative ligands are specific for alternative inorganic classes such as arsenic or hexavalent chromium, or classes or species of pathogens such as protozoa, parasites, spores, microbes, cysts, viruses or bacteria or species of organic molecules such as MTBE, oils, pharmaceuticals, proteins, amino acids or aromatics such as benzene or other volatile organic compounds.

BRIEF DESCRIPTION OF DRAWINGS

FIG. 4B shows two cavitands linked in a manner.

DETAILED DESCRIPTION OF EMBODIMENTS

Figure 1A:
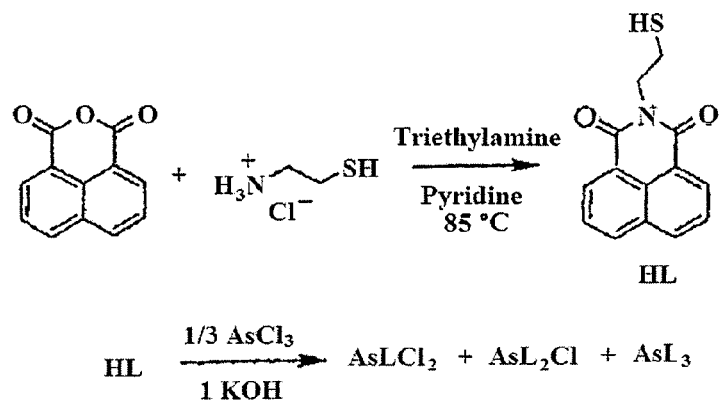
FIGS. 1A, 1B and 1C are schematics of alternative synthesis methods and one structural embodiment.
Figure 1B:
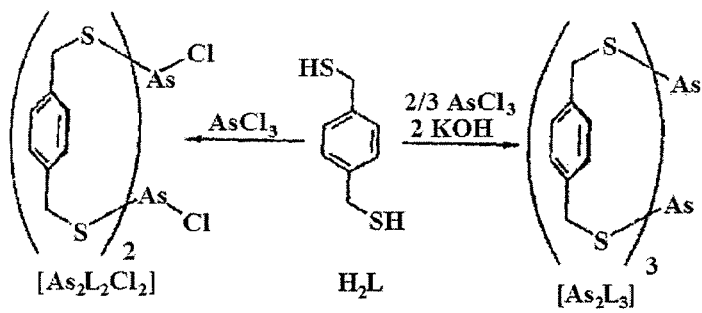
Figure 1C:
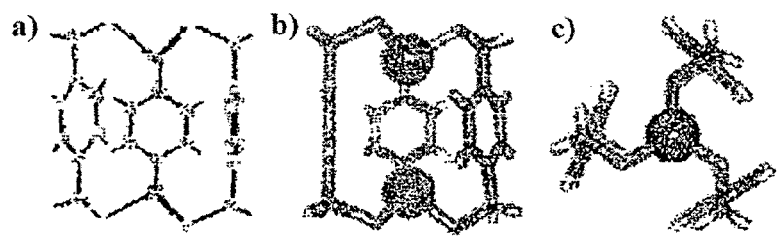

The synthesis and crystal structure of a new first-generation sulfur-based ligand —N-(2-mercaptoethyl)-1,8-naphthalimide, HL— capable of binding As(III) via a thiolate group with complementary secondary bonding interactions between the imido oxygen and arsenic has been reported by Johnson and co-workers in "Secondary Bonding Interactions Observed in Two Arsenic Thiolate Complexes"; $Inorganic$ $Chemistry;$ 2005, 44, 9634-9636 (8). A naphthalimide core was chosen as a model for future supramolecular chelators due to the proximity of its imido oxygens to the thiol and for its well known electronic absorption and emission properties. The complexes [$AsL_2Cl$] and [$AsL_3$] form by treatment of HL with $AsCl_3$. Thiol ligand HL was synthesized FIG. 1A in ca. 85% yield and formed light brown single crystals suitable for diffraction analysis from slow diffusion of acetonitrile into a $CHCl_3$ solution of HL. The single crystal X-ray structure of the ligand consisted of two sets of layers of ligands interacting via aromatic face-to-face π-π stacking with an intermolecular distance between adjacent layers of 3.45 Å (FIG. 1C). The planes formed by these two sets of layers are twisted at an angle of ca. 20°. This non-parallel arrangement is sustained by weak interactions between aromatic CH and oxygen atoms of the imide with d(C . . . O)=3.21 Å. Furthermore, in the crystalline state the mercapto-ethylene moiety adopts the expected anti conformation with a dihedral angle between the sulfur atom and the nitrogen atom of the imide of 177°.

Treatment of three equivalents of HL with $AsCl_3$ and a stoichiometric amount of KOH as a methanol solution yields a mixture of [$AsLCl_2$], [$AsL_2Cl$] and [$AsL_3$] complexes according to 1H NMR spectroscopy. However, treatment of an excess of HL with AsCl3 and KOH reproducibly provides [$AsL_3$] in 56% crystalline yield. The single crystals were verified to be [AsL₃] by single crystal X-ray diffraction and 1H NMR spectroscopy shows the bulk crystalline sample to be the same material. Pale yellow crystals suitable for X-ray analysis were obtained for both the [AsL$_2$Cl] and [AsL$_3$] complexes (FIG. 1B). The structure of [AsL$_2$Cl] CHC$_{l3}$ reveals that the complex is stabilized by As . . . O secondary bonding interactions (d(As . . . O)=2.91 Å) resulting from one ligand adopting a gauche conformation about the mercapto-ethylene moiety with a dihedral angle between the sulfur and nitrogen atoms of ca. 51°. This SBI is within the range of previously observed As . . . O secondary interactions and it suggests that in the crystalline state crystal packing forces and/or the As . . . O secondary interaction is at least strong enough to compensate for one unfavorable gauche interaction. The other ligand exists in the expected anti conformation with a corresponding dihedral angle of ca. 170°. The steric bulk of the ligand prevents additional As . . . O interactions from forming. The crystal packing of [AsL$_2$Cl] CHCl$_3$ is sustained by aromatic stacking similar to that observed for HL (FIG. 1C), with distances between the centroids of naphthalimide moieties of adjacent arsenic complexes ranging from 3.40 to 3.65 Å.

Figure 2:
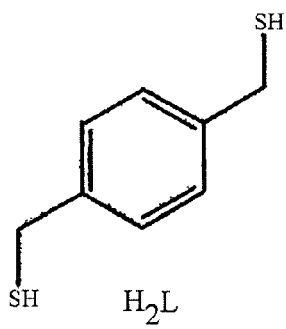
FIG. 2 is a schematic of alternative bifunctional ligand classes.
Figure 2:
Figure 2:
Figure 2:
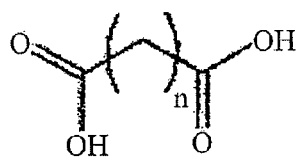
Figure 2:
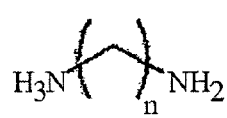
Figure 2:
Figure 2:
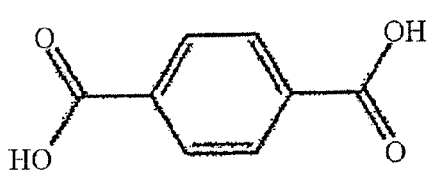
Figure 2:
Figure 2:
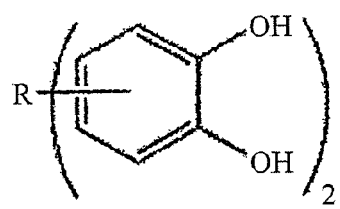
Figure 2:
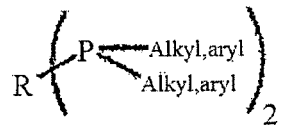

Crystal structures of a pyramidal complexes [As$_2$L$_3$] FIG. 1C and [AsL$_3$] (not shown) showing the gauche conformation adopted by the mercapo-ethylene moieties allowing for the secondary As . . . O bonding interactions of 2.91 and 3.21 Å for [AsL$_2$Cl] and [AsL$_3$], respectively. The crystal structure of [AsL$_3$] reveals that two of the ligands adopt the expected anti conformation ((S—C—C—N)=180° and 170°), while the third thiolate again adopts a gauche conformation ((S—C—C—N)=60°) to allow for one weak As—O interaction (d=3.21 Å). This distance is 0.3 Å greater than that observed in [AsL$_2$Cl], presumably due to the steric bulk of the additional third ligand in [AsL$_3$] (FIG. 2). Notably, none of the SBI's in [AsL$_3$] result in bond elongation of the As—S bonds, and all As—S and As—Cl bonds fall within the range of those reported in the CSD for related arsenic(III) complexes. The crystal packing of [AsL$_3$] is similar to that of HL and [AsL$_2$Cl] with the two sets of planes sustained by aromatic stacking (d(centroid-centroid)=3.50 to 3.56 Å) and twisted at an angle of ca. 37°.

Despite widespread awareness of the hazards of arsenic contamination in living organisms and the environment, surprisingly few arsenic thiolate complexes are structurally characterized. In fact, although it is well known that arsenic binds to cysteine sites in proteins (which contain a similar β-mercaptoamido structure), detailed structural studies of related arsenic thiolate complexes remain lacking. A β-mercaptoimido ligand that binds to arsenic through its thiolate with supporting As . . . O secondary interactions is described by Johnson and co-workers, below, where experimental details may be found.

Ligands of interest are prepared by a method of Johnson and co-workers as described in "Arsenic-π Interactions Stabilize a Self-assembled As$_2$L$_3$ Supramolecular Complex"; Angew. Chem. Int. Ed. 2004, 43, 5831, (9), incorporated by reference herein in its entirety. The trigonal-pyramidal coordination geometry of As(III) features a stereochemically active lone pair when coordinated by sulfur-based ligands and is predictable enough to be exploited as a target for specific ligand design. Treatment of N-(2-mercaptoethyl)-1,8-naphthalimide (HL) with stoichiometric amounts of AsCl$_3$ and base affords AsL$_2$Cl and AsL$_3$ complexes stabilized in part by secondary As . . . O bonding interactions. The use of these secondary bonding interactions (SBI's) between As(III) and heteroatoms of appropriate ligands offers a complementary tool for designing ligands specific for this ion. Secondary bonding interactions are observed between main group metals and heteroatoms such as O, N, S or halogens with interatomic distances less than the sum of the corresponding van der Waals radii. These interactions have only recently been systematically studied in the context of supramolecular chemistry and they offer a potentially useful method towards designing chelators optimized to bind main group metalloids. The β-mercaptoimido ligand represents two examples of SBI's between an imido oxygen of a ligand and the central arsenic atom of the complex.

The characteristic coordination of As(III) by sulfur-containing biological molecules such as glutathione or cysteine has recently been reported in the context of developing a better understanding of arsenic toxicity. However, there are relatively few known structures of arsenic thiolate complexes: a search of the Cambridge Structure Database (CSD) reveals only 59 examples of an As(III) ion coordinated by one or more thiolate organic ligands. Of these examples, only three complexes demonstrate As . . . O SBI's within the range of 2.7 to 3.2 Å. The use of thiolate ligands optimized for the specific pyramidal coordination geometry of As(III) that possess additional functional groups capable of exhibiting secondary bonding interactions is relevant towards designing specific chelators and sensors for this toxic main group element. One class of ligands used for the instant invention is of the benzyldithiol family; alternatives are shown in FIG. 2. Initial data indicate that the ligands are not toxic to humans or animals.

Figures 3A, 3B, 3C:
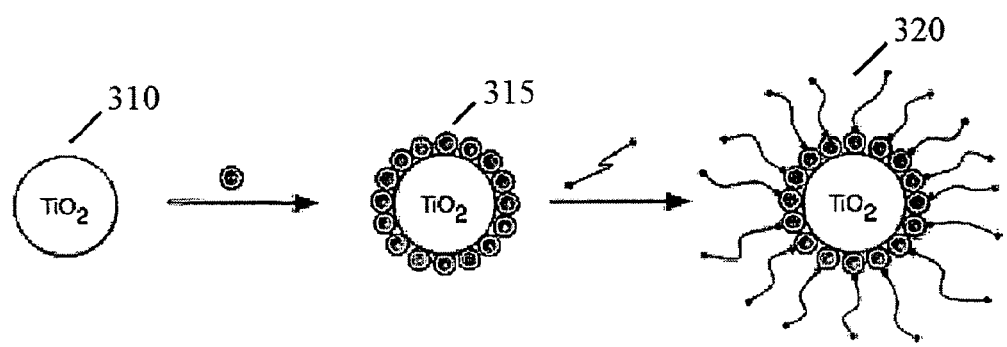
FIG. 3 is a cartoon showing multiple layers of ligands and contaminant.
Figure 3D:
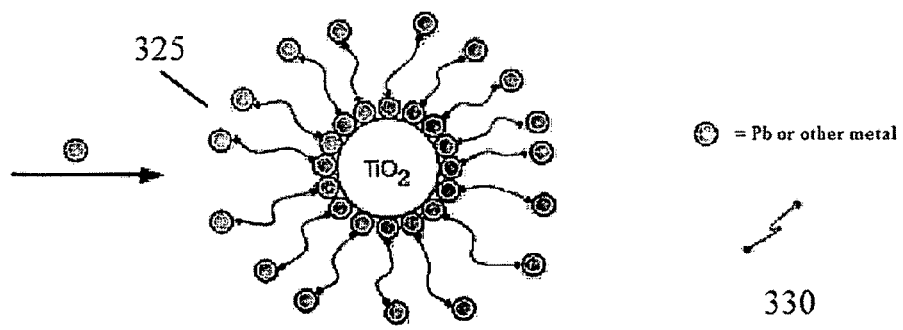

In one embodiment, adsorbent substrates such as titanium oxide, TiO$_2$, zeolites, surface modified zeolite, SMZ and others, may be "pre-loaded" or pre-coated with one or more guest species layers, then coated with a layer of bifunctional ligands; one coordination site of a bifunctional ligand attaches to a guest specie previously attached to a substrate; the other active or coordination site of a bifunctional ligand functions as a receptor site for an additional layer of guest species attachment. The cycle of adsorbing a guest, then ligand addition, may be repeated multiple times in order to extend the adsorbent capacity of a given substrate/ligand/guest specie combination. A "cartoon" in FIG. 3 shows, figuratively, the adsorption mechanism for removing lead, Pb, in one embodiment or, alternatively, arsenic (+3 and +5) from water. FIG. 3A starts with an uncoated TiO$_2$ substrate particle 310; FIG. 3B indicates an initial loading of lead 315 from a fluid, such as water; FIG. 3C shows a ligand nano-coating 320 being added onto a lead loaded substrate; FIG. 3D shows a second layer of lead 325 captured by a ligand nano-coating; multiple layers of lead are adsorbed in a similar manner. In this embodiment a bifunctional ligand comprises two active groups linked together 330. Guest specie refers to the material of interest being separated or sequestered from a fluid; sometimes a guest specie may also be termed a contaminant.

Figure 4A:
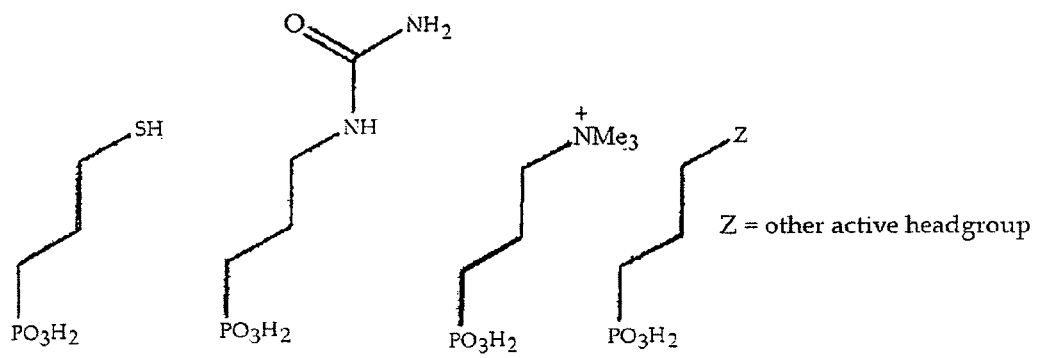
FIG. 4A is a schematic of compounds to functionalize TiO2.

In another embodiment, adsorbent substrates such as titanium dioxide, TiO$_2$, surface modified zeolite, SMZ and others, may be functionalized with alternative compounds to improve the adsorption of a bifunctional ligand prior to exposure to one or more species of interest. FIG. 4A shows alternative phosphonic acids for adsorption to a titanium dioxide substrate prior to adsorption of a predetermined ligand. Zeolites are easily hydrated and functionalized with alternative trimethoxysilanes such as those shown in FIG. 4B. In this embodiment a substrate is functionalized, coated with a ligand layer, exposed to one or more species in a fluid, recoated with a second ligand layer, re-exposed to one or more species in a fluid and so on. The cycle of ligand layer addition then adsorbing contaminants or other species, may be repeated multiple times in order to fully exploit the ability of a layer of bi- or multi-functional ligands to bind to various species and separate one or more species from a fluid.

Alternatively, a substrate material and bifunctional ligand may be optimized for targeting specific chemical species. For instance, soft metals such as lead, arsenic, cadmium, or mercury are targeted by soft Lewis base ligands including but not limited to thiol groups and other sulfur donors. Hard metals such as iron may be targeted with harder Lewis base donors including but not limited to oxygen ligands such as catecholates. Anions such as nitrate or perchlorate are attracted to hydrogen bond donor ligands such as, but not limited to urea-type groups.

EXAMPLE 1

Increases in mass are observed for each of three initial coating phases. Metsorb-G titania particles were soaked in a 1 M aqueous solution of $Pb(NO_3)_2$ overnight, filtered, and dried. The resulting coated particles were then soaked in an aqueous solution of $Na_2L$, where $H_2L=\alpha,\alpha'$-dimercapto-p-xylene. Upon addition to this solution, the surface of the particles became a brilliant yellow color. The particles were again filtered and air-dried, then soaked in 1 M aqueous lead nitrate once more and the filtration process repeated. The second soaking in lead solution caused the yellow color to intensify.

Figure 5:
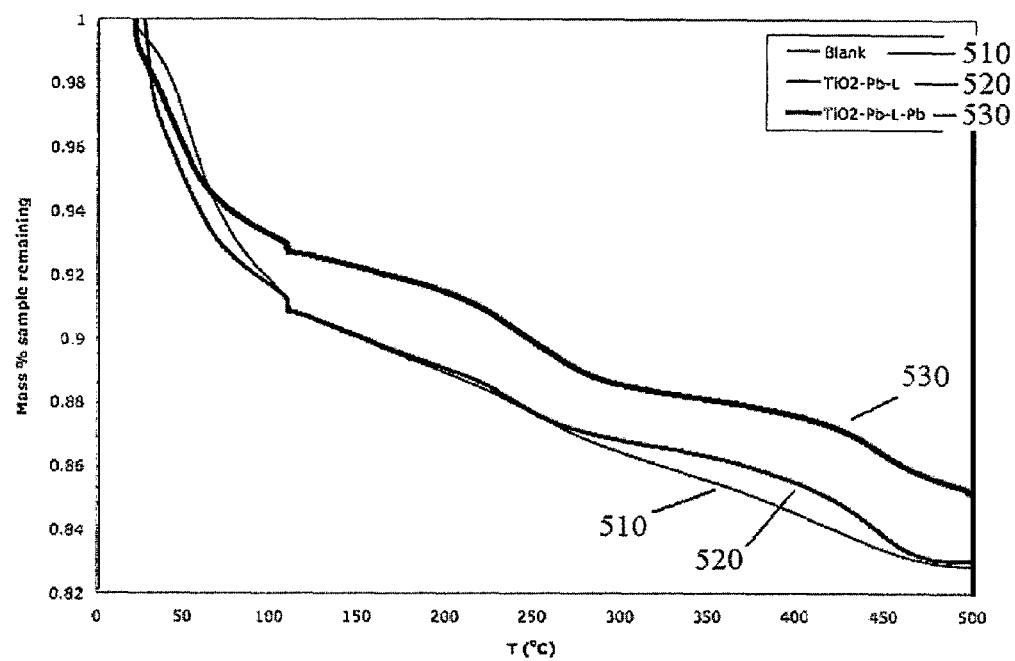
FIG. 5 is three thermogravimetric scans.

Thermogravimetric analyses of the above $TiO_2$ samples yields interesting behavior; shown in FIG. 5. A small amount of water is lost at approximately 100° C. As a first and second layer of Pb and ligand are added to $TiO_2$ particles, less mass loss is observed. Trace 510 is of untreated $TiO_2$; 520 is $TiO_2$ plus a layer of Pb and a layer of ligand; 530 is material similar to 520 plus an additional Pb coating. The 530 trace indicates that material has been added to the surface and that the added material is extremely stable to thermal degradation up to 500° C. Subsequent analysis of similar material as the 530 material indicated a lead content of about 13% by weight.

EXAMPLE 2

Arsenic(III) is adsorbed to non-functionalized $TiO_2$ in a similar manner as lead from Example 1. 10 mg of $NaAsO_2$ was dissolved in 20 mL DI water. 1 mL of this solution was then diluted to 1 L (overall [As(III)]~300 ppb) and 100 mg of Metsorb-G $TiO_2$ material was added to the solution and allowed to stand for 30 minutes. A second 1 mL aliquot of arsenic solution was added to the $TiO_2$ flask (regenerating the 300 ppb arsenic concentration, assuming that all metal adsorbed) and again allowed to stand for 30 minutes. This process was repeated until concentrated arsenic solution was completely used. A portion of this material was saved for analysis. The remainder was soaked in aqueous $Na_2L$ overnight. This material was then subjected to a second arsenic loading under conditions identical to those previously described.

A control experiment was performed in which 10 mg NaAsO2 was dissolved in 1 L of deionized water; 100 mg of $TiO_2$ was added and allowed to soak.

In one experiment, the initial loading of Arsenic (+3) on $TiO_2$ was about 0.35 percent by weight; the second loading of arsenic, after the filter media is regenerated with another ligand based coating was a cumulative 0.75 percent by weight. This data has been confirmed at ChemTrace Corporation of Fremont, Calif. In one experiment the capacity for Arsenic (+5) was about 70% of the capacity for Arsenic (+3). The arsenic is covalently bound to a ligand based coating, passing a standard TCLP leach test.

EXAMPLE 3

A $TiO_2$ substrate removes arsenic (+3) at a 150-ppb concentration from water up to 0.35% of the substrates weight for each layer of nano-coating applied and arsenic (+5) to 0.25% of its weight for each layer of nano-coating applied. For instance, 1,000 grams of filter media, with a single layer of nanocoating applied, removes 1.75 grams of arsenic (+3) and 1.25 grams of arsenic (+5). At a combined arsenic concentration of 300-ppb, 1,000 grams of substrate media treats 10,000 liters of water containing 150 ppb arsenic (+3) and 150 ppb arsenic (+5). When the same 1,000 grams of substrate media is regenerated with a new layer of nano-coating, it treats an additional 10,000 liters of water with 300-ppb of arsenic, loading an additional 1.75 grams of arsenic (+3) and 1.25 grams of arsenic (+5). For lower concentrations the loading declines somewhat; the overall amount of water treated stays about the same or increases. To treat water with 300-ppb of arsenic to 50-ppb or lower requires a contact time between the water and the substrate media be maintained at about 10 minutes.

The bifunctional ligand nano-coating is chemically designed to bind arsenic preferentially over iron and self assemble onto the substrate. The nano-coated substrate media was loaded with a 1-liter challenge solution of arsenic (+3) or (+5) at a concentration of 300-ppb. The challenge solution was mixed with 1-gram of the nano-coated adsorbent filter media for a period of 5 minutes to load ionized arsenic onto the filter media. By regenerating the same filter media with a new layer of nano-coating, an additional loading of arsenic (+3) of 0.38% by weight was layered onto the same substrate media. The combined loading with two (2) layers of arsenic (+3) separated by a layer of nano-coating is 0.73% by weight, results for As (+5) are about 70% of the As (+3) loading.

To add an additional layer of a bi- or multi-functional ligand nano-coating to a substrate, it is required is to immerse the substrate material in a solution of ligand salt; water is a convenient solvent. A substrate is immersed in a ligand solution for a predetermined contact time, for instance 60 minutes. After recoating of an additional ligand layer a substrate may be exposed again to a solution wherein guest specie for removal are resident. After some predetermined exposure period the substrate is removed from a guest specie solution and immersed in another ligand solution; this sequence may be repeated multiple times.

In an alternative embodiment a water filter employs a mineral adsorbent, titanium dioxide, with a ligand based coating. A titanium dioxide filter is separated into two portions; a first portion is exposed to prepared or contaminated water containing one contaminant, for example, arsenic; after saturation a substrate is removed, dried and exposed to an arsenic specific ligand based coating solution, which binds tightly to adsorbed arsenic attachment sites. A second portion is exposed to prepared or contaminated water containing a different contaminant species, for example, uranium; after saturation a substrate is removed, dried and exposed to an uranium specific ligand based coating solution, which binds tightly to adsorbed uranium attachment sites. A water filter comprises two portions, one for an arsenic specific substrate portion and one for an uranium specific substrate portion. A suitably prepared water filter is exposed to water containing both arsenic and uranium. Arsenic is preferentially adsorbed in the arsenic specific portion; uranium is preferentially adsorbed in the uranium specific portion. Alternatively other combinations of species may be selected and multiple combinations of organic, inorganic and pathogen may be selected. The ability to separate various classes of material species by selecting a preferential bi- or multi-functional ligand is a key novelty of the instant invention. A two portion water filter may be regenerated in two portions also. In this manner, both substrate portions are regenerated by applying an appropriate additional layer of a ligand based coating. A regenerated filter is capable of adsorbing an additional amount of one or more contaminant species again. A filter may be one or more portions comprising one or more preferential ligand coated regions. In one embodiment multiple preferential ligand coatings may be applied together to a multiple portion filter wherein a preferential ligand binds only to an associated bound species.

Suitable substrates for a ligand based coating comprise titania, zeolites, surface-modified zeolites, carbon, natural minerals or synthetic resins, with a macro, micro or nano porous structure and other materials known to one knowledgeable in the art. A species, for example arsenic, loading capacity is a function of how many active or attachment sites are available for binding; each substrate material has a different capacity based on its surface structure. Application of a ligand based coating to a substrate may start by pre-conditioning a substrate with a contaminant, for example arsenic, loaded solution, either prepared or by using water with high arsenic content. Alternatively, a substrate may be prepared by coating first with a compound which can functionalize a substrates surface enabling a ligand based layer or guest specie layer to be coated on to a prepared substrate. Alternatively, a substrate may require no special pretreatment apart from cleaning to remove debris or other foreign material; in these cases a bi- or multi-functional ligand attaches directly to active sites on a substrate and has one or more coordination sites available for guest specie attachment. In one embodiment an article of manufacture for specie separation comprises a substrate comprising a porous structure and at least one interaction or attachment site in combination with at least one ligand comprising at least two coordination or attachment sites, wherein the at least one ligand binds to the at least one substrate attachment sites by one of the at least two ligand coordination sites. The second ligand coordination site is available for attachment to a coordination site on the specie to be separated from a fluid; subsequently an additional ligand layer is added to the [substrate]+[ligand]+[specie] structure, forming: [substrate]+[ligand]+[specie]+[ligand]; and [substrate]+[ligand]+[specie]+[ligand]+[specie], etc.

Covalent bonding of a contaminant species to a ligand based coating is strong enough so that the species is not displaced by another species binding to a coated substrate and displacing or releasing a bound contaminant species. By layering a contaminant onto the filter media, separated by layers of a ligand based coating, a contaminant, for example arsenic, is bound between each layer as well. High adsorption capacity of a multi-coated substrate is achieved. Sufficient quantities of one or more species may be adsorbed to have economic value for industrial recovery, wherein one or more species has economic value initially.

Another embodiment adds a ligand based coating solution directly to a quantity of water; two or more guest species, such as contaminant molecules, are sequestered by a bi- or multi-functional ligand molecule and rendered inactive. The water may then be filtered through another filter, for instance, carbon, to remove ligand plus contaminant. Alternatively, water plus ligand plus sequestered contaminant may be drunk directly; passing passively through a person or animal.

Alternatively, a filter may be loose filter material dumped into a bucket of non-potable water and stirred around for a period of time, for example ten or fifteen minutes. In one embodiment arsenic loaded filter media is "filtered" from the water using a cloth, recovered and used again.

Figure 4B:
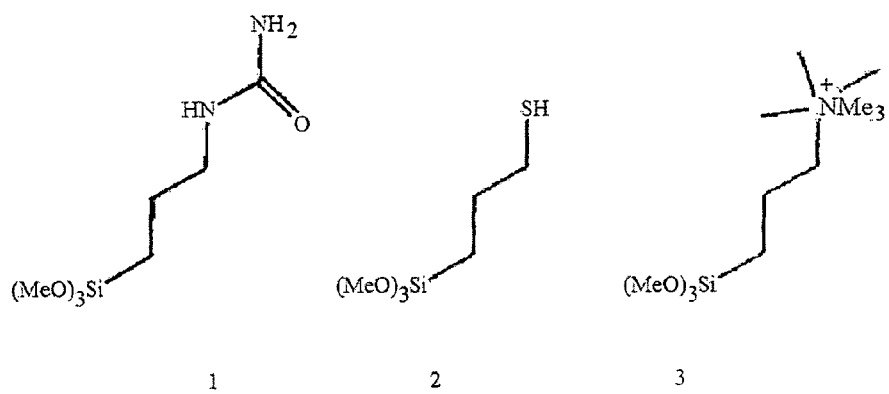
FIG. 4B shows compounds to functionalize zeolite.
Figure 6A:
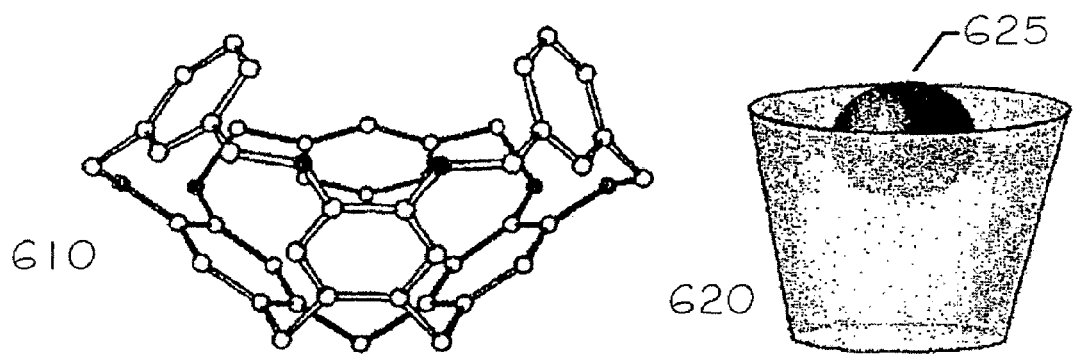
FIG. 6A is a schematic of a cavitand after Turner, et al.
Figure 6B:
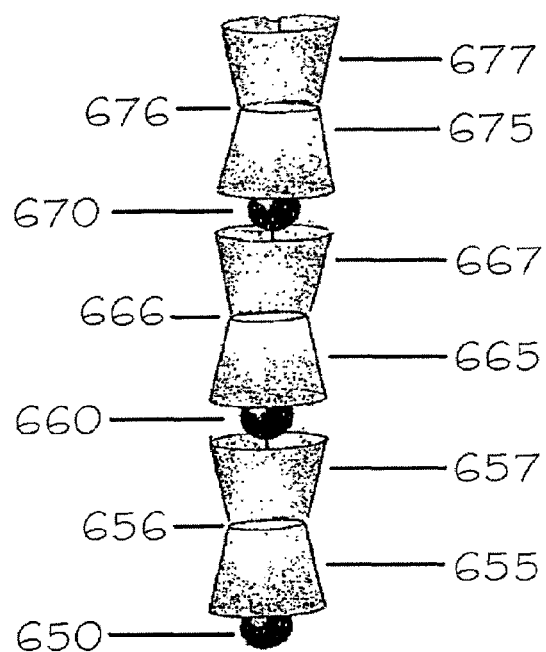

FIG. 6A is a figure from the Turner reference previously mentioned; found as FIG. 4b. This shows a crystal structure of a cavitand 610 and a "cartoon" of a cavitand 620 and sequestered guest specie 625. Another embodiment of the instant invention is shown in FIG. 6B. In this case guest specie 650 is attached to cavitand 655 which is linked via linking portion 656 to cavitand 657 attached to specie 660 which is also attached to cavitand 665 which is linked via linking portion 666 to cavitand 667 attached to specie 670 which is also attached to cavitand 675 which is linked to cavitand 677 via linking portion 676, and so on. The distinction with prior art is that in the instant invention a bi- or multifunctional ligand may comprise two or more coordination or attachment sites, the coordination sites being connected to one another through a linking structure. In this manner, in one embodiment, a layered structure is built up through a successive addition of first guest specie to substrate, first ligand to first guest specie, second specie to at least a second coordination site of first ligand, a first coordination site of second ligand to second specie, a third specie to at least a second coordination site of second ligand, and so on, repeating layers of ligand and specie to a predetermined limit. In an alternative embodiment it may be preferred to employ a surrogate specie to attach directly to a substrate as opposed to an intended target specie in a fluid; examples of species and surrogates may be lead as a surrogate for mercury.

In an alternative embodiment a first coordination site of a first ligand may attach directly to a substrate site and a first guest specie attach to at least a second coordination site of first ligand, and then a layered structure is built. Alternatively, a substrate may first be treated or coated with a material which functionalizes a surface in order to enhance attachment of a first specie or first ligand. Examples of such materials for functionalizing are phosphonic acids, examples shown in FIG. 4A, silanes, examples shown in FIG. 4B, or other organic or inorganic compounds which may coordinate simultaneously with a chosen substrate-ligand pair or substrate-specie pair; some examples are metallic thin films, carbon nano-tubes and nanospheres, metallic nano-tubes and nanospheres, ceramic nano-tubes and nanospheres, proteins and organic templates; others are known to one knowledgeable in the field.

In another embodiment, materials containing well-defined regions of different metals exhibit novel electronic properties leading to new and interesting devices. Nanofilms of specific composition to achieve specific electronic properties are sensitive to device size and composition. A ligand based nano-coating enables an addition of precise amounts of different metals wherein certain properties of a base nano-film are adjusted for a predetermined property.

In another embodiment incorporation of ligands containing chromophores, fluorophores, or other signal-transduction properties leads to materials capable of simultaneously binding and detecting species of interest. A detection may be either qualitative or quantitative in nature.

In another embodiment, layered materials are incorporated in medical devices such as reusable bioassays, possibly in conjunction with electronic or fluorescent detection schemes as previously described.

Foregoing described embodiments of the invention are provided as illustrations and descriptions. They are not intended to limit the invention to precise form described. In particular, it is contemplated that functional implementation of invention described herein may be implemented equivalently. Alternative construction techniques and processes are apparent to one knowledgeable with integrated circuit and MEMS technology. Other variations and embodiments are possible in light of above teachings, and it is thus intended that the scope of invention not be limited by this Detailed Description, but rather by Claims following.

What we claim is:

1. An article of manufacture for separating one or more species from a fluid comprising: a substrate comprising at least one attachment site; and at least one ligand comprising at least two coordination sites wherein at least two of the at least two coordination sites are identical such that the at least one ligand binds to the at least one attachment site by one of the at least two coordination sites.

2. The article of claim 1 wherein said substrate is substantially a material chosen from a group comprising titanium dioxide, zeolite, carbon, synthetic resins, alumina, aluminum hydroxide, and porous minerals.

3. The article of claim 1 wherein said at least one ligand is substantially a material chosen from a class comprising aliphatic and aromatic dithiols, aliphatic diureas, aliphatic and aromatic dicarboxylic acids, aliphatic and aromatic diamines, dicatecholates, aliphatic and aromatic phosphines and phosphine oxides, carcerands, cavitands and cryptands.

4. The article of claim 1 wherein said substrate further comprises a surface modified substrate wherein said substrate is functionalized with at least one from a group comprising trimethoxysilanes, phosphonic acids, metallic thin films, carbon nano-tubes and nanospheres, metallic nano-tubes and nanospheres, ceramic nano-tubes and nanospheres, proteins and organic templates.

5. The article of claim 1 wherein said species comprises one or more from a group comprising an organic molecule, an inorganic element or compound and a pathogen.

6. The article of claim 1 wherein said fluid is substantially water.

7. The article of claim 1 wherein said at least one attachment site is one or more chosen from a group comprising trimethoxysilane, an organic molecule, an inorganic element, an inorganic compound and a porous mineral.

8. An article of manufacture for separating one or more species from a fluid comprising: a substrate; at least one specie or surrogate specie adsorbed on the substrate; and at least one ligand comprising at least two coordination sites wherein at least one coordinationsite is bound to the one specie or surrogate specie.

9. The article of claim 8 wherein said substrate is substantially a material chosen from a group comprising titanium dioxide, zeolite, carbon, synthetic resins, alumina, aluminum hydroxide, and porous minerals.

10. The article of claim 8 wherein said at least one ligand is substantially a material chosen from a class comprising aliphatic and aromatic dithiols, aliphatic diureas, aliphatic and aromatic dicarboxylic acids, aliphatic and aromatic diamines, dicatecholates, aliphatic and aromatic phosphines and phosphine oxides, carcerands, cavitands and cryptands.

11. The article of claim 8 wherein said substrate further comprises a surface modified substrate wherein said substrate is functionalized with at least one from a group comprising trimethoxysilanes, phosphonic acids, metallic thin films, carbonnano-tubes and nanospheres, metallic nano-tubes and nanospheres, ceramic nano-tubesandnanospheres, proteins and organic templates.

12. The article of claim 8 wherein said specie and said surrogate specie are chosen from a group comprising an organic molecule, an inorganic element, inorganic compound and a pathogen.

13. The article of claim 8 wherein said fluid is substantially water.

* * * * *